(12) United States Patent
Bhattacharjee et al.

(10) Patent No.: US 10,009,392 B2
(45) Date of Patent: Jun. 26, 2018

(54) SYSTEM HEALTH AND INTEGRATION MONITORING SYSTEM

(71) Applicant: Level 3 Communications, LLC, Broomfield, CO (US)

(72) Inventors: Raja Bhattacharjee, Broomfield, CO (US); Kenneth W. Dudley, Clinton Township, MI (US); Richard J. Das, Farmington, MI (US)

(73) Assignee: Level 3 Communications, LLC, Broomfield, CO (US)

( * ) Notice: Subject to any disclaimer, the term of this patent is extended or adjusted under 35 U.S.C. 154(b) by 281 days.

(21) Appl. No.: 15/004,394

(22) Filed: Jan. 22, 2016

(65) Prior Publication Data
US 2017/0214722 A1 Jul. 27, 2017

(51) Int. Cl.
| | |
|---|---|
| *G06F 15/16* | (2006.01) |
| *H04L 29/06* | (2006.01) |
| *H04M 7/00* | (2006.01) |
| *H04L 12/18* | (2006.01) |
| *H04L 12/26* | (2006.01) |

(52) U.S. Cl.
CPC ........ *H04L 65/403* (2013.01); *H04L 12/1813* (2013.01); *H04L 12/1827* (2013.01); *H04L 12/1836* (2013.01); *H04L 43/0811* (2013.01); *H04L 43/0852* (2013.01); *H04M 7/006* (2013.01); *H04L 43/16* (2013.01)

(58) Field of Classification Search
CPC ........ H04L 43/00; H04L 43/06–43/062; H04L 43/0805–43/0894; H04L 43/16; H04L 12/1813–12/1836; H04L 65/403
See application file for complete search history.

(56) References Cited

U.S. PATENT DOCUMENTS

| | | | | |
|---|---|---|---|---|
| 6,665,392 | B1 * | 12/2003 | Wellner | H04L 12/1818 370/261 |
| 2002/0147835 | A1 * | 10/2002 | Zatloukal | H04L 29/06 709/237 |
| 2006/0272014 | A1 * | 11/2006 | McRae | H04L 63/1416 726/12 |
| 2009/0150400 | A1 * | 6/2009 | Abu-Hakima | G06F 17/30864 |
| 2012/0303830 | A1 * | 11/2012 | Tobioka | G06F 21/31 709/229 |
| 2012/0327175 | A1 * | 12/2012 | Couse | H04L 12/1818 348/14.08 |

(Continued)

*Primary Examiner* — Brendan Higa

(57) ABSTRACT

A method and system for monitoring the system health and/or integration of networks of a collaboration conferencing system of a telecommunications network is provided. In particular, a monitor system is provided that is associated with a telecommunications network to automate connection to a collaboration conferencing bridge that utilizes a plurality of collaboration conferencing systems. Through the automation of connecting to the conferencing bridge that is hosting the collaboration conference, the system may determine if one or more of the systems of the collaboration are underperforming when compared to performance standards for the systems. The connectivity or health information of the conferencing system may thus be measured and provided to a system administrator to identify the issues within the collaboration system to remedy to the detected issues.

18 Claims, 8 Drawing Sheets

(56) References Cited

U.S. PATENT DOCUMENTS

2013/0343232 A1* 12/2013 Terpstra ................ H04L 65/403
                                                       370/260
2014/0068106 A1*  3/2014 Turlington .......... H04L 41/0659
                                                       709/241
2015/0020178 A1*  1/2015 Grunin .................... H04L 63/08
                                                         726/7

* cited by examiner

550

Monitoring Application Ready Access Monitoring

Edit Parameters

Domain: DomainA
User Name: User.Name
Server: usadcwvconf01
Access #: 8009999999
Access CD: 1234567
Pass CD: 3588
Ban: WebConference
Name: WebConference
Overall Threshold: 250000 ← 552
Webex User Id:
Call Button: call me|call me ← 554
Login Url: https://conf.cfer.com/?acce ← 556
Join Meeting Url: /mc0901sp13/meetingcent ← 558
Join Meeting Url Parms: ← 560
DTMF: 4000|2000|4000|11** ← 562
Meeting Connected: view audio connection opti ←
End Meeting: End Meeting ← 564
End Meeting Button: End Meeting ← 566
Maint DT: 8/20/2015 9:02:56 AM
Main User: Domain\Username Save

FIG. 5B

SYSTEM HEALTH AND INTEGRATION MONITORING SYSTEM

TECHNICAL FIELD

Aspects of the present disclosure generally relate to systems and methods that provide for collaboration conferencing with multiple participants using devices connected to a telecommunication network, including a VoIP network, and more specifically for a system for testing the health and integration of the components of the collaboration conferencing system.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from several users to several thousand users communicating on the same telephonic, video and/or data call.

In many instances, the collaboration conference system includes systems and/or components from several different systems. For example, a first network or system may provide a voice component of the collaboration conference while a second network or system may provide an online component of the collaboration. However, because multiple systems may be incorporated or used for a collaboration conference, troubleshooting of issues that arise during the collaboration conference may be difficult as a single administrator may not have access to each component within the multiple systems. Thus, receiving an indication of a connectivity issue or other problem within the collaboration conference system and executing a solution to the detected problem may require extensive communication and sharing of remedies between the various operators of the varying systems of the collaboration conference. Such collaboration may be both time and workforce intensive.

It is with these and other issues in mind that various aspects of the present disclosure were developed.

SUMMARY

One implementation of the present disclosure may take the form of a method for testing a network. The implementation may include the operations of obtaining login information for a user of a collaboration conference feature hosted by the network from a subscription server, accessing a web-based portal to initiate a collaboration conference utilizing the obtained login information, and measuring a latency to connect to a conferencing bridge through the web-based portal. The method may further include comparing the measured latency to connect to a conferencing bridge to a threshold value comprising an upper limit on connecting to the conferencing bridge through the portal and transmitting an indication that the connection to the conferencing bridge through the portal exceeded the threshold value to a computing device of an administrator of the network.

Another implementation of the present disclosure may take the form of a system for testing a collaboration conference system on a telecommunications network. The system comprises a database storing user information for at least one user of a collaboration conference feature hosted by the telecommunications network, a subscription server in communication with the database and maintaining the user information of at least one user in the database, and a system monitor. The system monitor includes a processing device and a computer-readable medium connected to the processing device configured to store information and instructions that, when executed by the processing device, performs particular operations. Such operations include obtaining the user information of the at least one user of the collaboration conference hosted by the telecommunications network from the subscription server, accessing a web-based portal executed on a computing device to initiate a collaboration conference utilizing the obtained login information, and measuring a latency to connect to a conferencing bridge of the telecommunications network through the web-based portal. The operations also may include comparing the measured latency to connect to a conferencing bridge to a threshold value comprising an upper limit on connecting to the conferencing bridge through the portal and transmitting an indication that the connection to the conferencing bridge through the portal exceeded the threshold value to a computing device of an administrator of the network.

BRIEF DESCRIPTION OF THE DRAWINGS

FIGS. 5A-5B are illustrations of interfaces through which user information of a collaboration conference is obtained and updated.

DETAILED DESCRIPTION

Aspects of the present disclosure involve systems, methods, computer program products, and the like, for monitoring the system health and/or integration of systems of a collaboration conferencing system of a telecommunications network. In particular, a system is provided associated with a telecommunications network to automate connection to a collaboration conferencing bridge that utilizes a plurality of collaboration conferencing systems. For example, a collaboration conference may include a first system to provide an audio component of the collaboration and a second system to provide an online component of the collaboration. Through the automation of connecting to the conferencing bridge that is hosting the collaboration conference, the system may determine if one or more of the systems of the collaboration are underperforming when compared to performance standards for the systems. For example, the system may, during the automated connection to the conferencing bridge, detect that the online portion of the collaboration is not connecting. In another example, the audio portion of the collaboration conference is connecting the caller to the conferencing bridge, but the connection is occurring slower than anticipated or desired. The connectivity or health information of the conferencing system may thus be measured and provided to a system administrator to identify the issues within the collaboration system to remedy to the detected issues. In this manner, the health and integration of a collaboration system that utilizes one or more networks, systems, or administrators may be determined through the automated connection of the system to the conferencing bridge.

Figure 1:
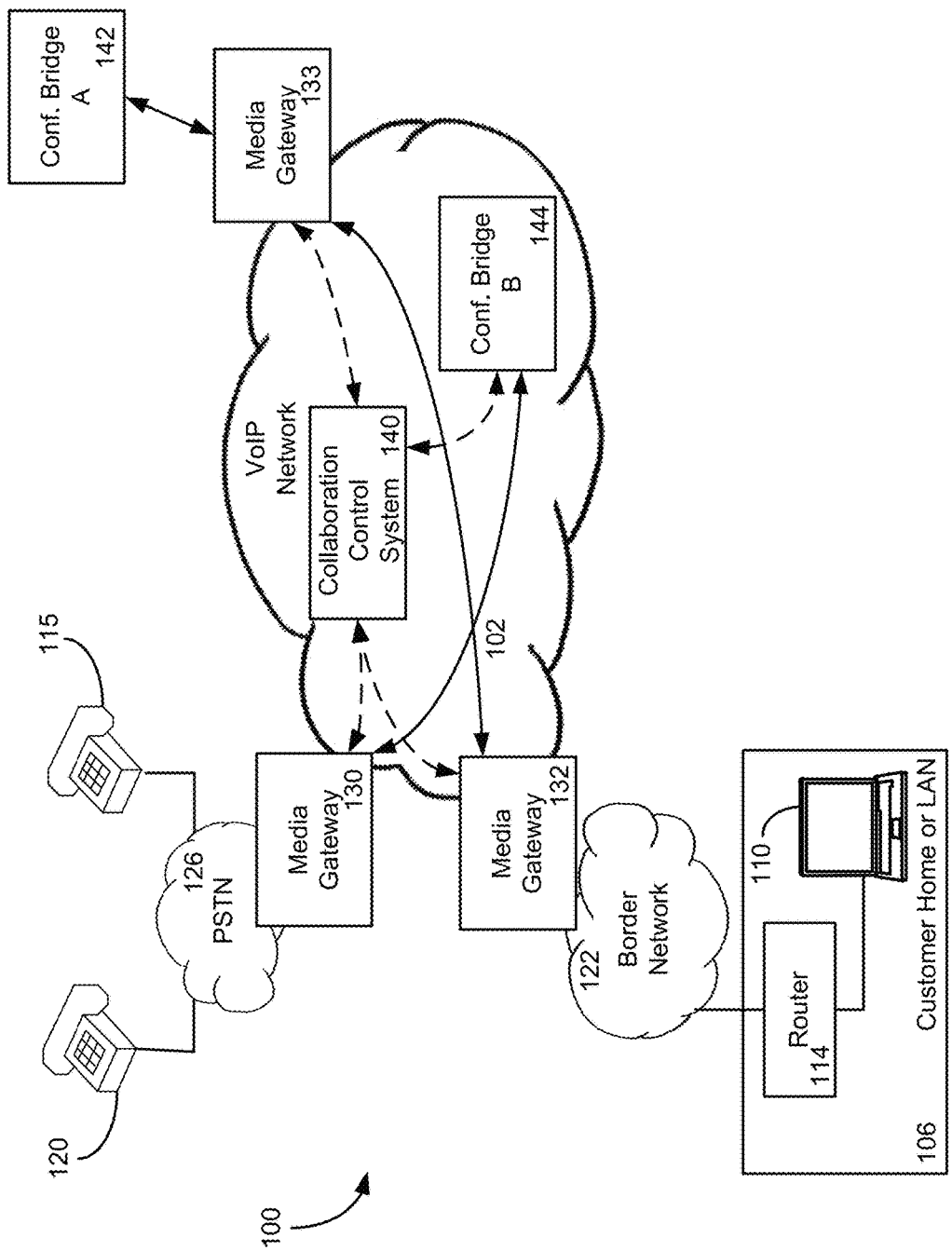
FIG. 1 is a schematic diagram illustrating an exemplary Voice over Internet Protocol (VoIP) operating environment, including a collaboration intelligence engine, in accordance with one embodiment.

FIG. 1 illustrates an exemplary operating environment 100 for hosting conference collaboration communications between multiple participants. The environment 100 provides for setting up communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that any communication network is envisioned as included in the operating environment 100. For example, network 102 may be a circuit switch communication network utilizing time division multiplexing (TDM) or plain old telephone service (POTS) switching. In general, the network 102 of FIG. 1 may be any communication network known or hereafter developed. However, for ease of understanding, a VoIP network embodiment is hereafter used to describe the communications network.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as telephonic devices 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115,120. Components of the customer network 106 are typically home- or business-based, but they can be relocated and may be designed for easy portability. For example, the communication device 110 may be a wireless (e.g., cellular) telephone or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other types of devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference and/or web collaboration, although any type of collaboration conference over a telecommunications network is envisioned with respect to the present disclosure. Similarly, although FIG. 1 illustrates the communication devices 110, 115, 120 as telephonic devices, the communication devices may be any type of communication device, including personal computers, cellular phones and the like.

Upon receipt of the request for a collaboration conference, the network 102 routes the request to a collaboration control system 140 integrated within the network 102. It should be appreciated that the collaboration control system 140 may be a part of the network 102, may be separate from the network, or may have portions deployed in the network and out of the network. In addition, the collaboration control system 140 may be resident on one or more components of the VoIP network 102, including several instances of the collaboration control system integrated throughout the network.

To transmit the request to the network, the requester uses the communication device 110,115,120 to dial a conference specific telephone number and/or access a web-based collaboration conference component. In one embodiment, the network, upon receipt of the dialed communication, executes an application that queries the requester to enter an access code number that the requester enters into the communication device 110, 115, 120. In response, the collaboration control system 140 may route the one or more requests to one of several conference bridges 142,144 associated with the VoIP network 102 for hosting of the collaboration conference. Although only two conference bridges 142,144 are shown in FIG. 1, it should be appreciated that any number of conference bridges may be associated with the network 102 for hosting collaboration conferences.

In general, the conference bridges 142,144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the communications network 102 through which the communications of the conference are transmitted. This configuration is utilized for Internet Protocol (IP) based bridges.

Additionally, the collaboration control system 140 may be configured for use with any number of network and conference bridge platforms. For example, the telecommunications network 102 of FIG. 1 may be configured as a TDM network or an IP-based network, which includes video, audio and web-based components, to which the routing component 140 may be configured to interface. Another particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based routing devices may utilize many of the advantages of information exchange within the header when communicating with TDM-based network devices.

To connect to a collaboration conference, each participant to the conference may be routed to the same conference bridge 142,144 for the duration of the conference. The conference bridge 142,144, in turn, provides communication ports for each participant such that each participant can hear or otherwise participate in the collaboration conference. Any conference bridge known in the art or hereafter developed may be integrated into the system 100 of FIG. 1 for hosting a collaboration conference. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

Figure 2:
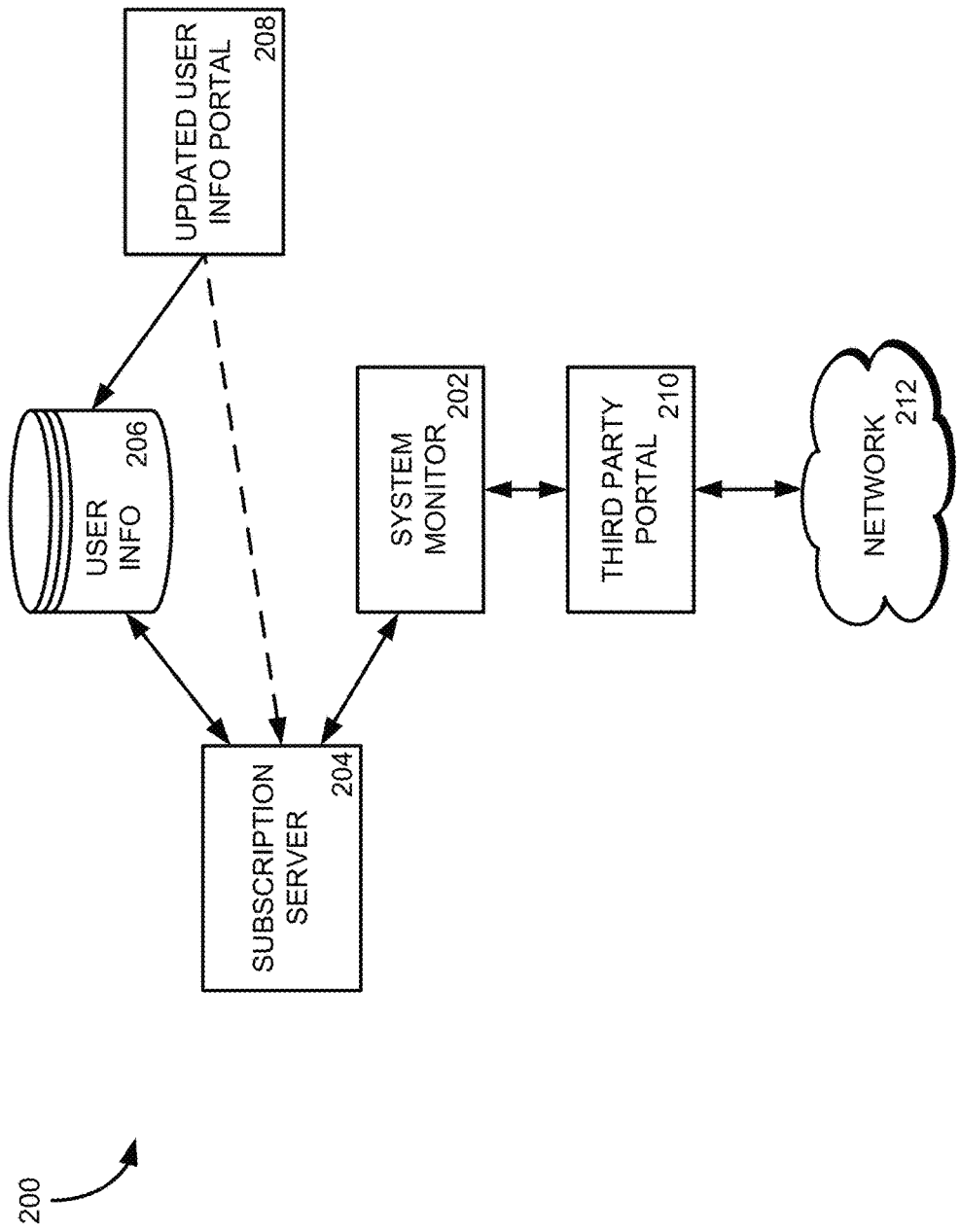
FIG. 2 is a schematic diagram illustrating an exemplary system for monitoring the health and integration of the systems of a collaboration conferencing system.

FIG. 2 is a schematic diagram illustrating an exemplary system 200 for monitoring the health and integration of the systems of a collaboration conferencing system. In one embodiment, the components of the system 200 are included in the network 102 discussed above with reference to FIG. 1. In other embodiments, the components of the system 200 are in communication with the network 102 as described but otherwise are separate from the network. As should be appreciated, the system 200 may include more or fewer components than those illustrated in FIG. 2. As such, the system 200 illustrated in FIG. 2 is but one example of a system for monitoring the health and integration of a collaboration conferencing system.

In general, the system 200 includes a system monitor 202. In one embodiment, the system monitor 202 is a program executed on a computing device, such as an application server or personal computer. The system monitor 202 may perform one or more of the operations described below in reference to FIGS. 3 and 4B to monitor the health, connectivity, integration, or any other aspect of a collaboration conferencing system of a telecommunications network. To perform these operations, the system monitor 202 may communicate with a subscription server 204 of a telecommunications network. In general, the subscription server 204 is a computing device that maintains information of one or more users or subscribers to a collaboration conferencing feature available through a telecommunications network 102. As such, the subscription server 204 may be operated by an administrator of the telecommunications network 102 through collaboration conferences are available. In one particular embodiment, the subscription server 204 is dedicated to a particular customer to the telecommunications network 102 to store and maintain all or some of the network users associated with that particular customer. For example, each network user assigned the same customer number or identification may be associated with a particular subscription server 204. In another embodiment, the subscription server 204 may maintain information for any number of collaboration customers, such as through one or more virtual machines executed by the subscription server 204.

In general, the information maintained by the subscription server 204 includes access information for the users associated with the server to the collaboration conferencing feature. For example, the collaboration conferencing system may assign a user identifier, access number and code, password, Uniform Resource Locator (URL) associated with the user, a customer number a user is associated with, and the like. This information is utilized by the system so that the system may identify certain users to provide proper services and billing to the users of the system. In the embodiment where the subscription server 204 is dedicated to a particular customer, the associated database 206 may also be dedicated to the particular subscription server 204. In another embodiment, the database 206 may be shared among several such servers of the system 200.

The user information stored in the database 206 and maintained by the subscription server 204 may be updated periodically as new users and/or new services are added to a particular customer's plan. In the system 200 embodiment illustrated in FIG. 2, the user information is updated directly in the database from the updated user information portal 208. Such a portal 208 may be available to one or more administrators of a telecommunications network that hosts or is otherwise associated with the collaboration conference system. In another embodiment, the updated user information portal 208 may communicate directly with the subscription server 204 to provide updated user information to the server. Once provided, the subscription server 204 may update the user information database 206 accordingly. Updating user information is described in more detail below with reference to FIG. 5B.

The system monitor 202 may also communicates with a third party portal 210 that provides access to a collaboration conference on the telecommunications network 102. As explained above, certain components of the collaboration conference may be provided by separate networks or facilitators, such as an audio portion provided by a first network and a web portion provided by a second network. Thus, in some instances, a user of the collaboration conference feature utilizes a portal to begin or otherwise access the collaboration conference. The portal 210 may be operated by a third party facilitator or administrator that is separate from the network on which the system monitor 202 executes. As shown in the system 200 of FIG. 2, the system monitor 202 may utilize the third party portal 210 to access a telecommunications network 212 used for providing the collaboration conference feature to the system monitor. In one example, the network 212 is the telecommunications network 102 discussed in reference to FIG. 1 above.

Figure 3:
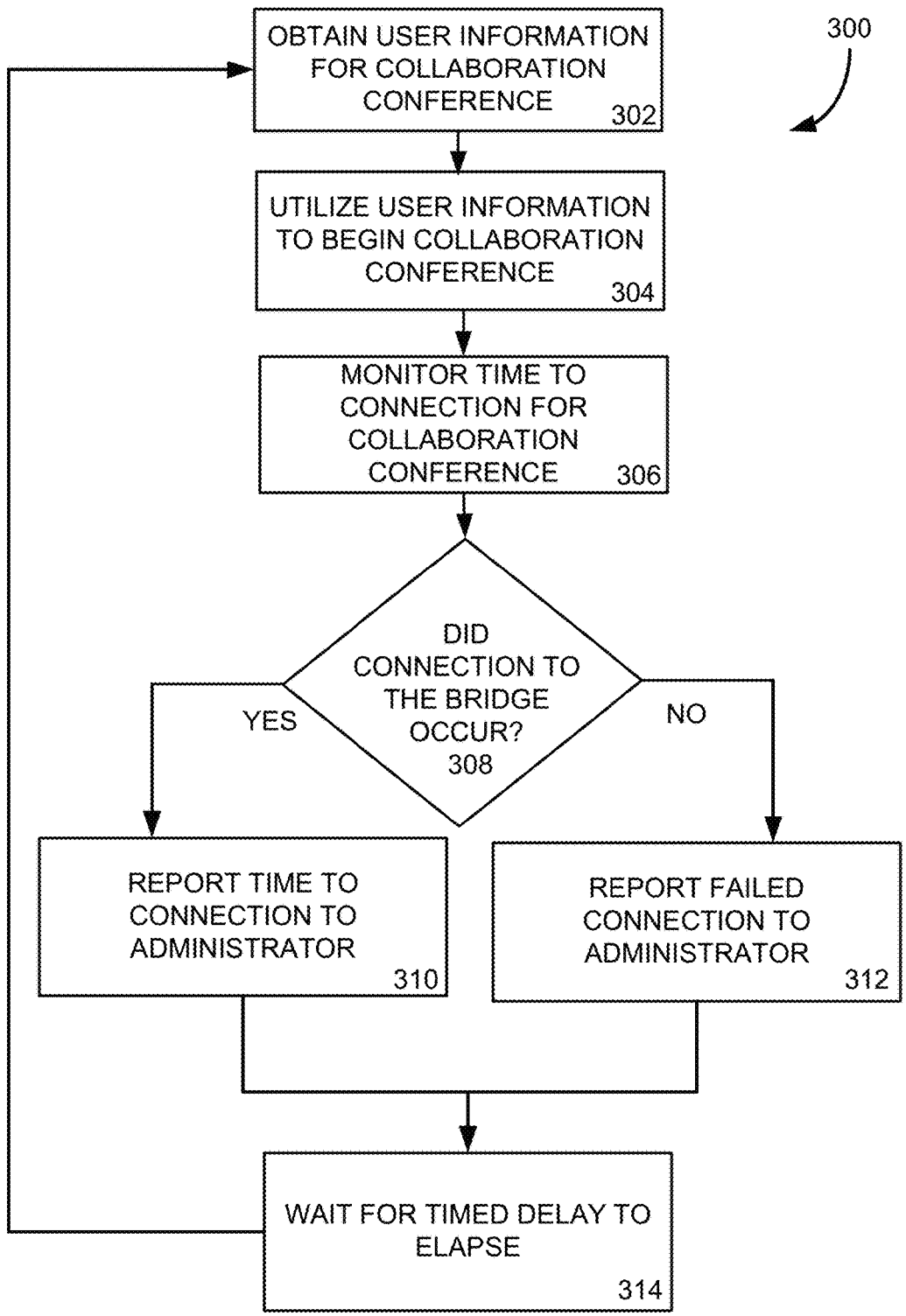
FIG. 3 is a flowchart of a method for a system to monitor the health and integration of the systems of a collaboration conferencing feature of a telecommunications network.

As mentioned, the system monitor 202 may monitor the system health and/or integration of systems of a collaboration conferencing system of the telecommunications network. In particular, FIG. 3 is a flowchart of a method for the system monitor 202 to monitor the health and integration of the systems of a collaboration conferencing. Thus, the operations of the method 300 may be performed by the system monitor 202 of the system 200 of FIG. 2. In general, the operations may be performed through one or more software programs, one or more hardware components, or a combination of both software and hardware of the system monitor 202.

Beginning in operation 302, the system monitor 202 obtains user information for a collaboration conference session provided for by one or more telecommunications network. For example, the system monitor 202 may request user information from the subscription server 204. The subscription server 204 may obtain the information from the user information database 206 and provide the information to the system monitor. In general, the user information includes information that a user of the system may utilize to log into the collaboration conferencing system to join a collaboration conference. Such information may include, but is not limited to, a user identification, a customer identification, an access number, an access code, an Internet Protocol (IP) address of a computing device associated with the user, and the like.

In operation 304, the system monitor 202 utilizes the obtained information to initiate a collaboration conference through the third party portal 210 to the collaboration conference feature. In one particular example, the system monitor utilizes a computing device to navigate to the third party portal 210 (such as through a URL associated with the portal). Once at the portal, the system monitor 202 may populate certain fields within the portal 210 with the obtained user information. Other operations performed by the system monitor 202 include selecting one or more buttons or otherwise indicating next steps within the log-in process of the portal 210. In general, any interactions between the system monitor 202 and the third party portal 210 may or may not include the user information obtained from the subscription server 204.

Through the portal 210, the system monitor 202 may automatically initiate a collaboration conference with a telecommunications network. In one particular embodiment, the collaboration conference may include portions hosted by separate networks or facilitators, such as an audio portion hosted on a first network and a web portion hosted on a separate network. In general, however, the system monitor 202 initiates the collaboration conference through the portal 210 in a similar manner in which a user of the system would initiate the collaboration conference. In other words, the system monitor 202 utilizes the user information to begin or join a collaboration conference through the same or similar process by which a human user utilizes the portal 210.

As the system monitor 202 initiates the collaboration conference through the portal 210, the monitor may also begin measuring the time or latency to connection with the collaboration conference 306. More particularly, the system monitor 202 may monitor the time or latency to connect to the various components of the collaboration conference, including time to connect to the web portion and/or time to connect to the audio portion of the collaboration conference. The system monitor 202 may also determine the responsiveness of the portal 210 itself during the log-in and conference initiation processes are completed. In general, through the timing of the various connections of the networks to initiate a collaboration conference, the system monitor 202 may determine if one or more connectivity issues exist within the networks during establishing the conference. To aid the system monitor 202, one or more threshold values may be maintained by the system monitor and applied to the various steps performed within the portal 210. Any step to initiate the conference that exceeds the threshold value may be noted and reported to a system administrator, as explained in more detail below. The system monitor 202 may time or otherwise measure how long any one step in the number of steps of the portal 210 to access or initiate the collaboration conference of the telecommunications network.

In operation 308, the system monitor 202 may determine if connection to a collaboration conference occurs. In some instances, one or more of the components or networks that are used to join or initiation a collaboration conference may not be functioning during the automated logging in by the system monitor. Such a malfunction of the components may cause the system monitor to be unable to connect to the conferencing bridge that is hosting the collaboration conference. If the connection fails, the system monitor 202 reports the inability of the monitor to connect to the collaboration conference in operation 312 to a system administrator associated with or otherwise in communication with the system monitor 202. If the monitor 202 is connected to the collaboration conference through the portal 210, the monitor may then report the measured time to perform the steps of connecting to the collaboration conference through the portal 210 to the system administrator in operation 310.

In general, the system monitor 202 transmits information to one or more network administrators associated with the system monitor. In one embodiment, the administrator provides one or more portions of the collaboration conference. For example, a telecommunications network company may provide the collaboration conference feature to its clients. However, the company may host the audio portion of the conference to the customer and utilize a second network or company to provide the web portion. In this example, the network administrator may not have access to those components used for the web portion of the collaboration conference. To monitor the general health of the system and the integration of the networks, the administrator may use the system monitor 202 to access the collaboration conferencing system and provide information or reports on the connection speed of the system. Thus, in one embodiment, the system monitor 202 provides the measured information to a network administrator of the collaboration conferencing system. However, the system monitor 202 may be configured to provide a report on the health and integration of the collaboration conferencing system to any user of the system monitor. Through the report or information provided by the system monitor 202, an administrator may determine which network or component may not be performing adequately and initiate a process to remedy the issue.

In one embodiment, the report generated by the monitor system 202 includes an electronic mail sent to an account associated with the administrator of the system. In another embodiment, the report may be provided through a graphical user interface that the administrator accesses to view the report. In general, the report may be provided to the administrator in any manner to alert the administrator to a detected issue with the collaboration conferencing system. Further, the monitor system 202 may be configured to provide a report following each test of the system, provide a report after a number of tests, and/or provide a report only when a latency of the system is detected that exceeds a particular threshold value, among other configurations.

In operation 314, the monitor system 202 waits for a timed delay to elapse. In general, the system monitor 202 may be configured to perform the above operations any number of times, including routinely after a delay time has elapsed between executions of the operations. In one particular example, the operations of the system monitor 202 may be performed every five minutes to continually test the performance of the collaboration conferencing system. Other delays between tests may also be incorporated into the system. Regardless of the timed delay, the system monitor 202 may return to operation 302 once the delay has elapsed to being the method 300 again to test the connection to the collaboration conferencing system. By automating of initiating a collaboration conference through the portal 210, the system monitor 202 may continually monitor and perform an end-to-end test the system health and integration of components of the system to ensure proper operation and/or determine when an issue occurs and in which component or network such an issue occurred.

Figure 4A:
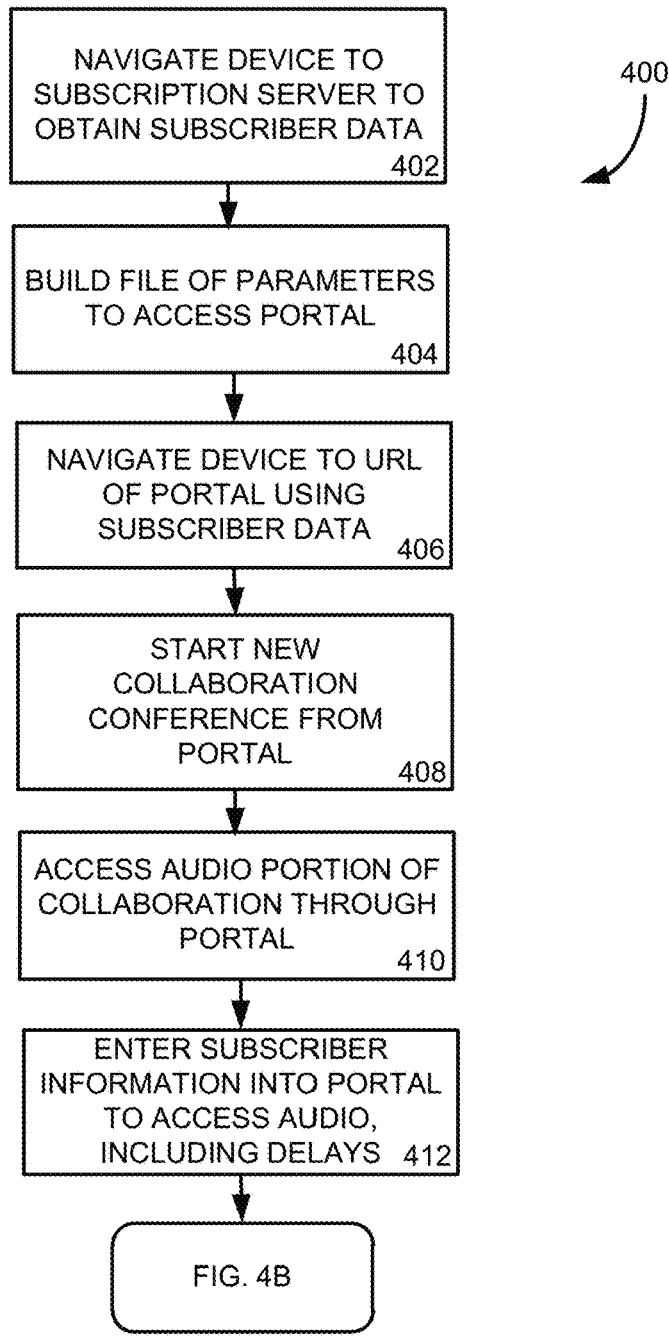
FIGS. 4A-4B illustrate a flowchart of a method for a system monitor computing device to access a portal to a collaboration conferencing system to test the connectivity of the conferencing system.
Figure 4B:
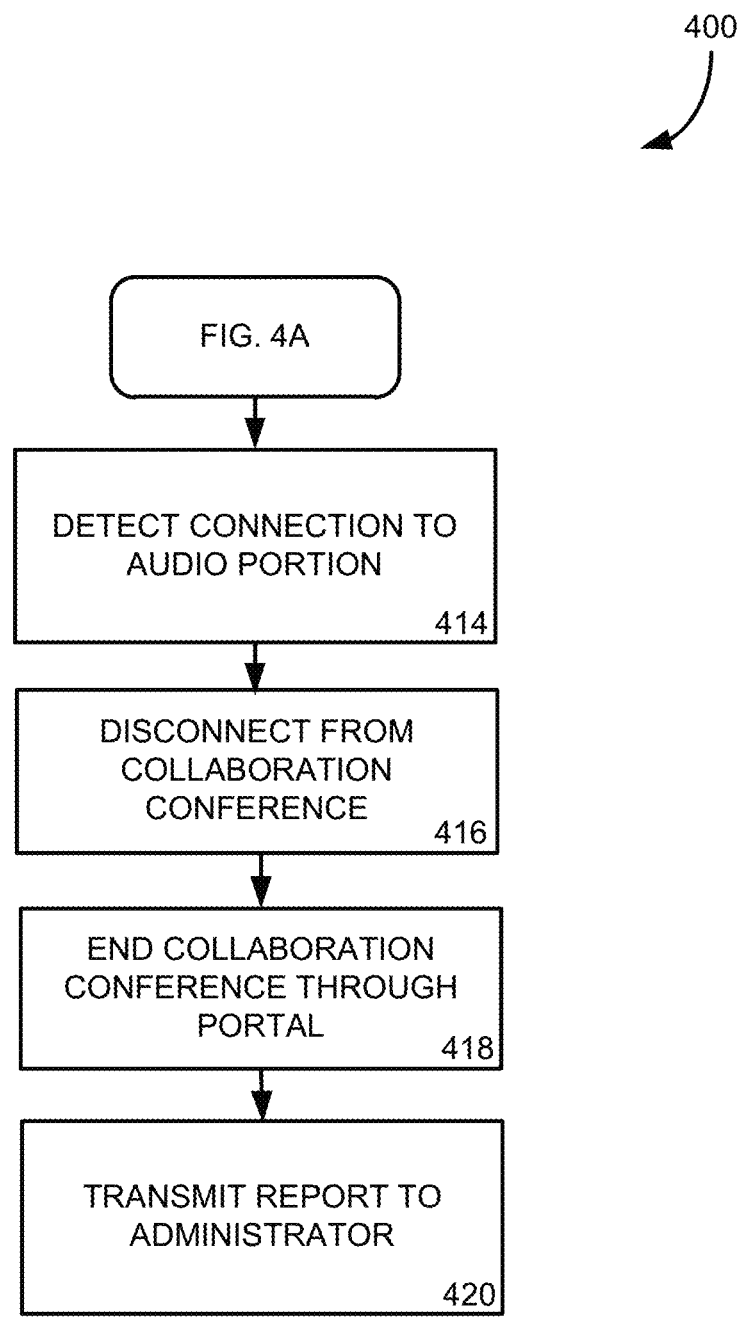

FIGS. 4A-4B illustrate a flowchart of a method for a system monitor 202 computing device to access a portal 210 to a collaboration conferencing system to test the connectivity of the conferencing system. As such, the operations of the method 400 may be performed by the system monitor 202 discussed above in relation to the system 200 of FIG. 2. More particularly, a computing device (such as an application server or desktop computing device) executes one or more instructions to perform the operations of the method 400 of FIG. 4. It should be appreciated at the method 400 is but one example of operations to monitor the system or network health and integration of a collaboration conferencing system.

Beginning in operation 402, the system monitor 202 utilizes a computing device to navigate to a subscription server 204 from which subscriber information or data may be obtained. For example, the subscription server 204 may be an application server that is accessible through a URL or IP address. Thus, the system monitor 202 utilizes the computing device to communicate with the subscription server 204 through some access to the server, such as by utilizing a URL address to navigate to a web-based interface executed by the subscription server through which the subscriber or user information is available.

Figure 5A:
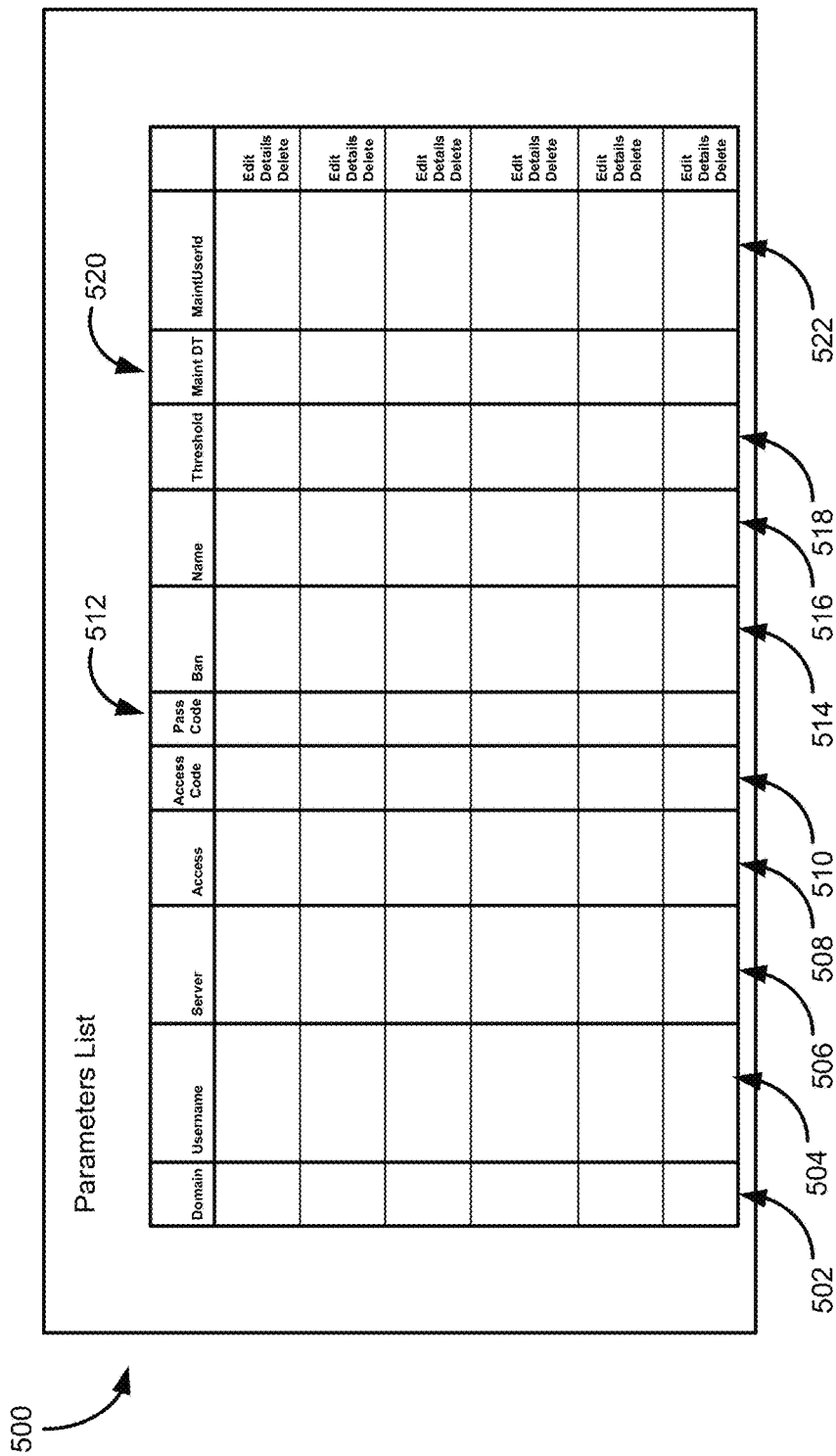

In one embodiment, the user or subscriber information is stored or otherwise maintained in a table 500 similar to that illustrated in FIG. 5A. As such, the information obtained by the system monitor 202 from the subscription server 204 may include any of the information included in the table 500 of FIG. 5A. Although the table 500 is illustrated in FIG. 5A as empty, the various entries within the table may be populated by the subscription server 204 as users are added to the collaboration conferencing system. In general, the table 500 includes entries that identify a particular user of the collaboration conference, such as columns for a particular Domain, Username 504, and Name 516. Other information within the table 500 may also help the collaboration system to identify particulars about a user's account, such as column for a server 506 through which the user's information is available, a billing account number 514, a maintenance schedule 520, and log-in information 524 for a network administrator to perform maintenance on a user's account. In addition, access information to initiate a collaboration conference associated with a particular user is also provided, such as an access number 508 that is used to dial into a collaboration conference, an access code 510 that identifies a particular user of the system, and a pass code 512. More or less information may be included in the user information table 500 as desired by an administrator of a network hosting the collaboration conference.

As mentioned, the system monitor 202 accesses the subscription server 204 to obtain user information. In one embodiment, the information provided by the server 204 may include one or more of the information entries in the user information table 500 of FIG. 5. This information provides access information associated with a particular user of the system to the system monitor 202. In operation 404, the system monitor builds a file of such access parameters that may be utilized to gain access to a collaboration conference through a portal 210. As explained in more detail below, the file is utilized by the system monitor 202 during the process of initiating a collaboration conference through a web-based portal 210.

In operation 406, the system monitor 202 navigates the computing device to the collaboration conference portal 210. For example, the portal 210 may be a webpage that is accessible through a URL entered into a browser executed on the computing device. Further, the URL that is utilized to access the portal 210 may include one or more of the user information obtained by the system monitor 202. For example, a domain name, user name, or a server identification may be used and included directly in the URL to access a particular portal 210 to begin the process of initiating the collaboration conference. Once accessed, the portal 210 may provide a user interface (such as within the browser of the computing device) through which a collaboration conference is initiated or joined.

Through the portal 210, the system monitor 202 may start or join a new collaboration conference in operation 408. In one particular embodiment, the system monitor 202 may click or otherwise select a button within the portal 210 to begin the collaboration conference. For example, the system monitor 202 may analyze the hypertext markup language (HTML) of the portal webpage to determine the location of the button to begin a collaboration conference within the webpage. Further, the system monitor 202 may then provide an input to the webpage at or near the location of the "start conference" button to activate the button and start a collaboration conference. However, it should be appreciated that different types of portals 210 to different types of collaboration conferencing systems may have alternative layouts and/or other ways through which a user may initiate a collaboration conference. The system monitor 202, in such circumstances, may be aware of the portal 210 type such that whatever operations are used to initiate or join a collaboration conference through the portal, the system monitor performs those operations to begin the collaboration conference through the portal. The selection of activation of a "start" button is but one example of such operations that are performed by the system monitor 202.

In a similar manner in operation 410, the system monitor 202 connects to an audio portion of the collaboration conference. Thus, the system monitor 202 may select a "connect to audio" button or otherwise indicate through the portal 210 that an audio portion of the collaboration conference is initiated. In some instances, selecting to activate an audio portion through the portal 210 creates one or more prompts for more information entered through the portal. For example, the portal 210 may request a user to enter subscriber information (such as an access number and/or access code) to authenticate the user for the collaboration conference. Thus, in operation 412, the system monitor 202 enters the requested information into the portal 210 to begin the audio portion. Such information may be the information obtained from the subscriber server 204 discussed above. Further, such information may be input to the portal 210 with one or more delays between fields of information to allow the collaboration conferencing system to receive the entered information. For example, an access number may be entered into a field in the portal 210, followed by a five second delay, followed by entering an access code into another field in the portal. In general, any combination of information and delays may be input in the portal 210 from the system monitor 202 to authenticate the system monitor to the audio portion of the collaboration conference.

Continuing to FIG. 4B, the system monitor 202 may detect when the audio portion of the collaboration conference is connected. The connection of the audio portion indicates that the computing device of the system monitor 202 is connected to the conferencing bridge hosting the collaboration conference through the network hosting the audio portion. Similarly, the system monitor 202 may detect when the web portion of the collaboration conference is also connected. In one embodiment, the detection of the connection to the conferencing bridge hosting the collaboration conference occurs when the interface of the portal 210 changes to indicate the connection is successful. Once the system monitor 202 is connected, the monitor may provide an input to the portal 210 to disconnect from the collaboration conference in operation 416. Further, the system monitor 202 may end the collaboration conference through the portal in operation 418 in a similar manner.

Throughout the process of entering the collaboration conference and disconnecting from the conference, the system monitor 202 may time or otherwise determine the latency experienced for each step in the process of the method 400 of FIGS. 4A-4B. By measuring the latency of the steps experienced by the system monitor 202, the monitor may determine if there is a performance issue with one or more of the components and/or networks associated with the collaboration conference. In one embodiment, the system monitor 202 may compare the measured latencies with one or more threshold values to determine if the connectivity of the conferencing system is within expected bounds. If the monitor 202 detects that the connection to the conferencing bridge occurs too slow, the monitor may prepare a report or alarm and transmit the report to a system administrator in operation 420 to alert the administrator of a potential issue with the collaboration conferencing system. In this manner, the system monitor 202 may monitor the system health and/or integration of systems of the collaboration conferencing system of a telecommunications network by logging into the system as a user of the system such that the system monitor does not need intimate access to each component of the collaboration conferencing system or network.

Returning to the system 200 of FIG. 2, the user information stored in the database 206 may be updated through a user information update portal 208. The user information stored in the database 206 may also include specific information utilized by the system monitor 202 to log into the third party portal 210. For example, FIG. 5B illustrates 5B an interface accessible through the updated user information portal 208 to update user information of a collaboration conference. Through the editing interface 550, a system administrator may edit the user information stored in the database and used by the system monitor 202 to log into the collaboration conference through the portal 210.

In general, much of the user information editable through the edit interface 550 includes the information discussed above with reference to FIG. 5A. Thus, the edit interface 550 includes a domain name and user name associated with a particular user. A server that maintains the user information is also included. The additional information to identify a user, such as an access number, access code, billing account number, and customer name is also editable. Also editable are parameters associated with the user that aid the system monitor 202 in accessing a collaboration conference through the portal 210. For example, the interface 550 includes a threshold value 552 that defines the number (in milliseconds) allowed for the entire process of accessing the collaboration conference to complete. As explained above, if the threshold value is reached, the system monitor 202 will shut down and a notification with the last step completed (and the specific user information to log into the collaboration conference) is transmitted to a system administrator.

Other entries in the interface 550 also aid the system monitor 202. For example, the name of the button to connect to the audio portion of the collaboration conference is included as the "call button" 554 entry. This entry defines what button in the portal 210 the system monitor 202 searches for to connect to the audio portion of the collaboration conference. In this manner, the entry 554 may be altered by an administrator to respond to different types of portal 210 or updates to a portal interface. In a similar manner, a login URL 556 and a join meeting URL 558 are also included in the editable interface 550 that navigate the system monitor 202 to the portal 210 and/or a website to start a collaboration conference.

As mentioned above, the system monitor 202 may enter information into the portal 210 when accessing a collaboration conference. In one embodiment, the information entered may be in the form of a dual-tone multi-frequency (DTMF) series of inputs to the portal. Thus, the editable interface 550 includes a string of DTMF inputs 560 entered into the portal 210 to access the collaboration conference. Further, the DTMF string may include one or more delays (represented in the interface as vertical lines) to ensure that each entry is received by the system. In addition, the interface 550 may include an entry 562 defining the name of the button within the portal 210 that indicates when a connection is successful, an entry 564 that defines the name of the button in the portal 210 that disconnects the user from the collaboration conference, and an entry 566 that defines the name of the button in the portal that ends the collaboration conference. Through these definitions in the interface 550, the system monitor 202 may successfully navigate the portal 210 to test the connectivity of the collaboration conference system. Further, the entries within the interface 550 may be edited to adjust to new or updated portal interfaces.

Figure 6:
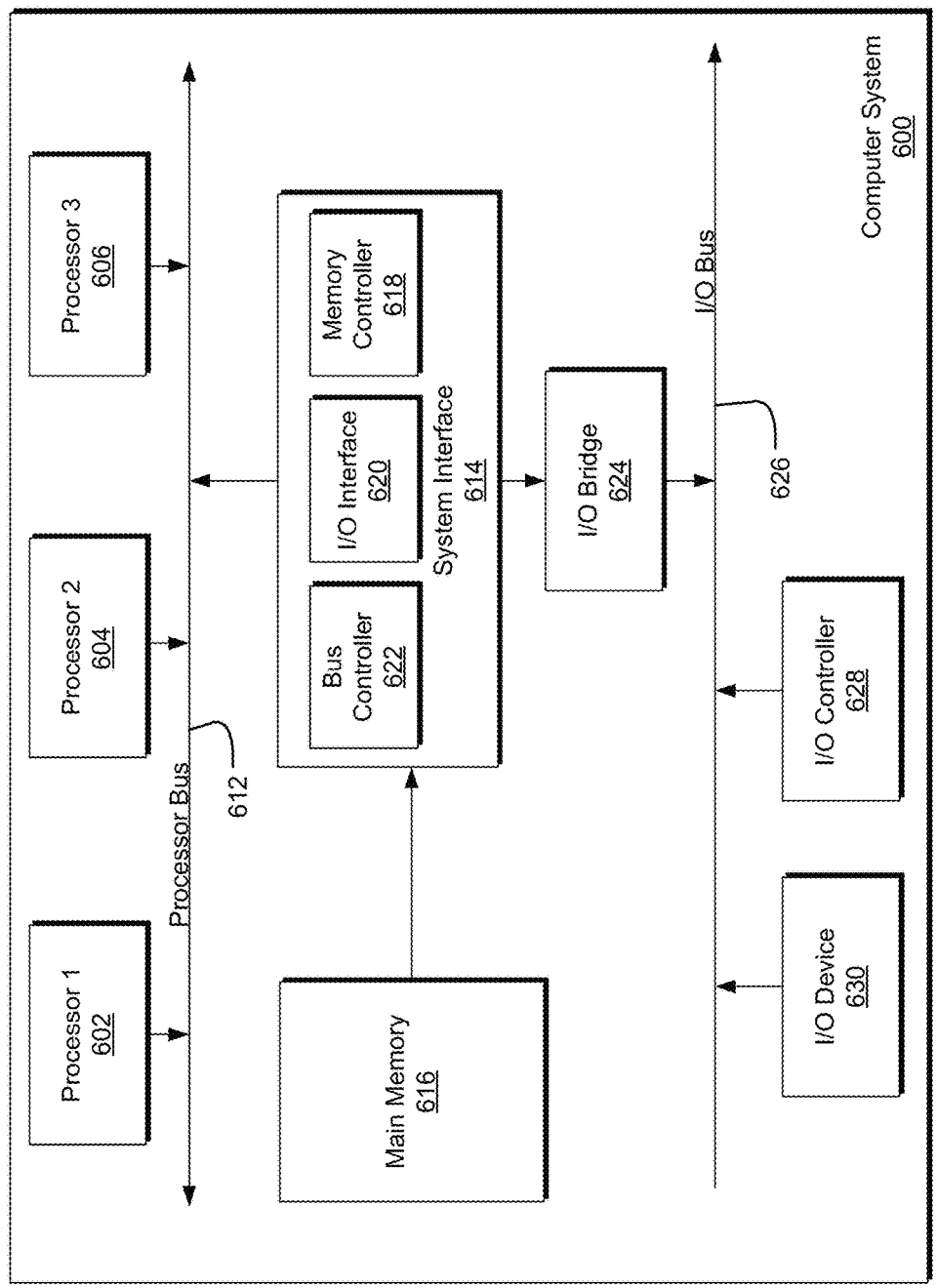
FIG. 6 is a diagram illustrating an example of a computing system which may be used in implementing embodiments of the present disclosure.

FIG. 6 is a block diagram illustrating an example of a computing device or computer system 600 which may be used in implementing embodiments of the present invention. For example, the computing system 600 may be the system monitor 202 described above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. Processors 602-606 may also be purpose built for processing/mixing media data, such as audio or video components of a media stream, such as a digital signal processor. System interface 614 may be connected to the processor bus 612 to interface other components of the system 600 with the processor bus 612. For example, system interface 614 may include a memory controller 616 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 660, as illustrated.

I/O device 660 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for testing a network, the method comprising:
   obtaining login information for a user of a collaboration conference feature hosted by the network from a subscription server;
   accessing a web-based portal to initiate a collaboration conference utilizing the obtained login information;
   measuring a first latency to connect to a first conferencing bridge through the web-based portal, the first conferencing bridge comprising an access point to a web portion of the collaboration conference;
   comparing the measured first latency to a first threshold value comprising an upper limit on connecting to the first conferencing bridge through the portal;
   measuring a second latency to connect to a second conferencing bridge through the web-based portal, the second conferencing bridge comprising an access point to an audio portion of the collaboration conference;
   comparing the measured second latency to a second threshold value comprising an upper limit on connecting to the second conferencing bridge through the portal;
   transmitting an indication that the connection to at least one of the first and second conferencing bridges through the portal exceeded the applicable threshold value to a computing device of an administrator of the network; and
   periodically repeating at least the obtaining, the accessing, the measuring, and the comparing at regularly scheduled intervals.

2. The method of claim 1 wherein the collaboration conference comprises an audio portion and connecting to the conferencing bridge through the web-based portal comprises connecting to the audio portion of the collaboration conference.

3. The method of claim 1 wherein the collaboration conference comprises a web portion and connecting to the conferencing bridge through the web-based portal comprises connecting to the web portion of the collaboration conference.

4. The method of claim 1 wherein the web-based portal is accessed through a uniform resource locator (URL) associated with the web-based portal, the URL comprising a portion of the login information for the user of the collaboration conference feature hosted by the network.

5. The method of claim 1 wherein the login information comprises at least an access number and an access passcode associated with the user of the collaboration conference.

6. The method of claim 5 wherein accessing the web-based portal to initiate the collaboration conference comprises entering the access number and the access passcode into an interface of the web-based portal.

7. The method of claim 6 further comprising:
selecting a disconnect portion of the interface of the web-based portal to disconnect from the collaboration conference.

8. The method of claim 1 further comprising:
detecting a non-connection condition with the collaboration conference through the web-based portal.

9. The method of claim 8 wherein the transmitted indication comprises a non-connection indicator.

10. A system for testing a collaboration conference system on a telecommunications network, the system comprising:
a database storing user information for at least one user of a collaboration conference feature hosted by the telecommunications network;
a subscription server in communication with the database and maintaining the user information of at least one user in the database; and
a system monitor comprising:
a processing device; and
a computer-readable medium connected to the processing device configured to store information and instructions that, when executed by the processing device, performs the operations of:
obtaining the user information of the at least one user of the collaboration conference hosted by the telecommunications network from the subscription server;
accessing a web-based portal executed on a computing device to initiate a collaboration conference utilizing the obtained login information;
measuring a first latency to connect to a first conferencing bridge of the telecommunications network through the web-based portal;
comparing the measured first latency to a first threshold value comprising an upper limit on connecting to the first conferencing bridge through the portal;
measuring a second latency to connect to a second conferencing bridge through the web-based portal, the second conferencing bridge comprising an access point to an audio portion of the collaboration conference;
comparing the measured second latency to a second threshold value comprising an upper limit on connecting to the second conferencing bridge through the portal;
transmitting an indication that the connection to at least one of the first and second conferencing bridges through the portal exceeded the applicable threshold value to a computing device of an administrator of the network; and
periodically repeating at least the obtaining, accessing, measuring, and comparing at regularly scheduled intervals.

11. The system of claim 10 wherein the collaboration conference comprises an audio portion and the system monitor connects to the conferencing bridge through the web-based portal by connecting to the audio portion of the collaboration conference.

12. The system of claim 10 wherein the collaboration conference comprises a web portion and the system monitor connects to the conferencing bridge through the web-based portal by connecting to the web portion of the collaboration conference.

13. The system of claim 10 wherein the web-based portal is accessed through a uniform resource locator (URL) associated with the web-based portal, the URL comprising a portion of the login information for the user of the collaboration conference feature hosted by the network.

14. The system of claim 10 wherein the login information comprises at least an access number and an access passcode associated with the user of the collaboration conference.

15. The system of claim 14 wherein the system monitor accesses the web-based portal to initiate the collaboration conference by entering the access number and the access passcode into an interface of the web-based portal.

16. The system of claim 15 wherein the executed information and instructions of the system monitor further comprises:
selecting a disconnect portion of the interface of the web-based portal to disconnect from the collaboration conference.

17. The system of claim 10 wherein the executed information and instructions of the system monitor further comprises:
detecting a non-connection condition with the collaboration conference through the web-based portal.

18. The system of claim 17 wherein the transmitted indication comprises a non-connection indicator.

* * * * *